United States Patent
Poder

(10) Patent No.: US 6,851,721 B2
(45) Date of Patent: Feb. 8, 2005

(54) FAST COUPLER WITH CONNECTION INDICATOR

(75) Inventor: Philippe Poder, Guichen (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/433,467

(22) PCT Filed: Dec. 20, 2001

(86) PCT No.: PCT/FR01/04101
§ 371 (c)(1),
(2), (4) Date: Jun. 3, 2003

(87) PCT Pub. No.: WO02/052188
PCT Pub. Date: Jul. 4, 2002

(65) Prior Publication Data
US 2004/0051307 A1 Mar. 18, 2004

(30) Foreign Application Priority Data
Dec. 22, 2000 (FR) .............................. 00 16908

(51) Int. Cl.[7] .............................................. F16L 35/00
(52) U.S. Cl. ................... 285/93; 285/308; 285/319; 285/305
(58) Field of Search ........................... 285/305, 39, 93, 285/308, 319

(56) References Cited

U.S. PATENT DOCUMENTS

| | | | | |
|---|---|---|---|---|
| 4,804,213 A | * | 2/1989 | Guest | 285/308 |
| 4,944,536 A | * | 7/1990 | Bartholomew | 285/319 |
| 5,178,424 A | * | 1/1993 | Klinger | 285/319 |
| 5,378,025 A | * | 1/1995 | Szabo | 285/39 |
| 5,425,556 A | * | 6/1995 | Szabo | 285/4 |
| 5,441,313 A | * | 8/1995 | Kalahasthy | 285/93 |
| 5,568,946 A | * | 10/1996 | Jackowski | 285/38 |
| 5,662,359 A | * | 9/1997 | Kargula | 285/93 |
| 5,895,078 A | * | 4/1999 | Le Clinche | 285/305 |
| 5,915,738 A | * | 6/1999 | Guest | 285/24 |
| 5,992,895 A | * | 11/1999 | Steinkamp | 285/45 |
| 6,082,779 A | | 7/2000 | Lesser et al. | |
| 6,089,616 A | * | 7/2000 | Trede et al. | 285/93 |
| 6,318,764 B1 | * | 11/2001 | Trede et al. | 285/305 |
| 6,428,055 B1 | * | 8/2002 | Moretti et al. | 285/319 |
| 6,536,807 B1 | * | 3/2003 | Raymond et al. | 285/93 |

FOREIGN PATENT DOCUMENTS

DE 198 22 574 10/1999

* cited by examiner

Primary Examiner—James M. Hewitt
(74) Attorney, Agent, or Firm—Young & Thompson

(57) ABSTRACT

A fast coupler for a fluid connection includes a male part and a female part. The female part having a staged counterboring whereof the cross-section of larger diameter can receive an outer flange of the male part, beyond a mobile lock in a housing transverse to the counterboring. The coupler also includes a connection indicating device locked on the female part by a device partly housed in the housing and deactivated by the flange of the male part when it is inserted into the counter boring. The indicator device may include a member for permanent connection to the closed fluid circuit by the coupler.

7 Claims, 1 Drawing Sheet

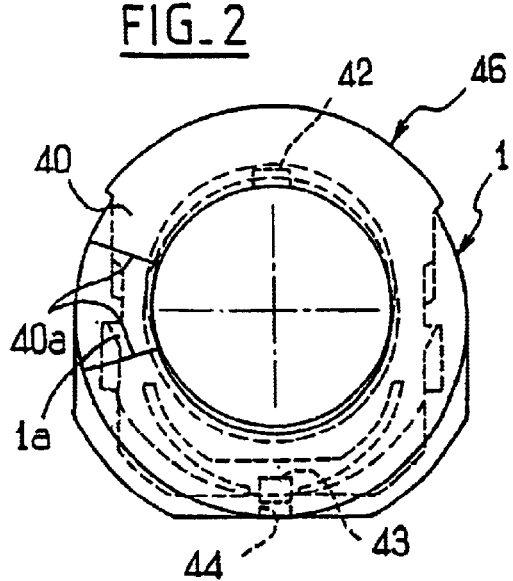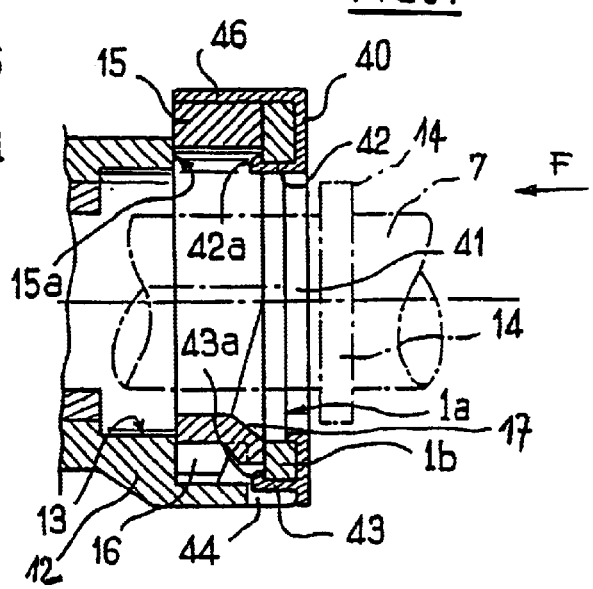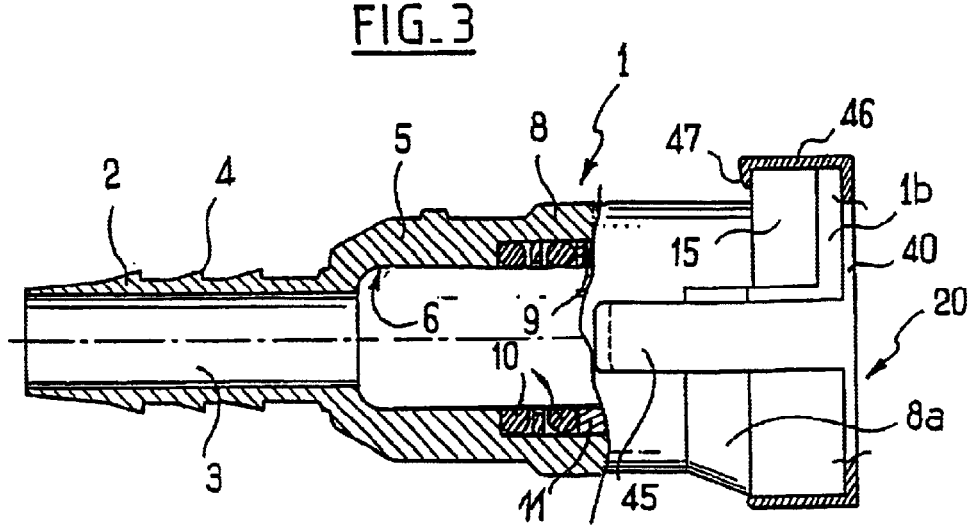

FAST COUPLER WITH CONNECTION INDICATOR

The present invention relates to a quick coupler comprising a male portion and a female portion which couple together merely by inserting one into the other, and it relates more particularly to a quick connector which possesses means enabling the quality of the coupling achieved to be verified quickly.

BACKGROUND OF THE INVENTION

In circuits conveying fluids under pressure and making use of quick couplers, it is desirable, or even required, to be guaranteed that connections are made properly. A poorly-established connection is firstly a source of leaks and secondly a risk of uncoupling which has the consequence at very least of causing the machine including said pressurized fluid circuits to break down, and if the machine is a motor vehicles, and which can constitute the cause of an accident (no pressure in pneumatic braking circuits, fuel leaking into the engine compartment leading to a fire . . . ).

Numerous manufacturers have made proposals for associating quick couplers of this type with an indicator device for indicating when a connection has been made correctly. To illustrate that known type of device, mention is made of document U.S. Pat. No. 4,946,205, and document U.S. Pat. No. 5,152,555 which describe a kind of fork with tines received in grooves of the body of the female element of the coupler, and projecting into the bore of said female element to be situated on the path of a collar of the male element. Those tines possess respective inwardly-directed catches preventing the device from being withdrawn so long as the collar of the male element is not situated level with them, where it acts as a cam to space them apart in order to release the catches. Since the position of the collar relative to the female element, when the collar is level with the tines of the fork, corresponds to coupling being properly established, the fact that the indicator device can be withdrawn guarantees the quality of the connection that has been made. One of the drawbacks of those devices stems from their very structure. The fork must be sufficiently stiff for its tines to be difficult to spread apart from each other merely by turning the fork about the axis of the coupler and using the wall of the female element of the coupler as a cam for moving the tines apart. Under such circumstances, the device presents a high degree of resistance to insertion of the male element of the coupler into the female element, and that can mislead the fitter into believing that a proper connection position has been reached. This is particularly true when the tines of the indicator device are of relatively small thickness so that inclusion of the indicator device does not add to the length of the coupler, which would make it necessary to have sliding surfaces for the collar of the male element to slide over the tines of the indicator that are slightly inclined relative to the radial plane, whereas in order to reduce the force required for penetration it would be appropriate for the sliding surfaces to be steeply inclined which would require the device to be much thicker. The compromise that is used in practice is such that the key for confirming connection can be extracted from its housing merely by being manipulated, which constitutes a drawback.

Document FR 2 705 431 discloses another solution for indicating that proper coupling has been made between the two portions of the coupler and is similar to document U.S. Pat. No. 6,082,779 which describes a variant in which the indicator is held captive.

OBJECTS AND SUMMARY OF THE INVENTION

The present invention proposes another structure for a captive indicator device which does not affect the lateral size of the coupling and which makes it possible to be put back into place after coupling, confirming that coupling has been implemented properly and is properly maintained.

The invention thus provides a quick coupler for a fluid circuit, the coupler comprising a male portion with an outer collar, and a female portion, the female portion having stepped counterbore with a maximum diameter section that can receive the outer collar of the male portion, which section is beyond a latch that is movable in a housing extending transversely to the counterbore, and including a connection indicator device that is snap-fastened onto the female portion by means housed in part in the housing and released while the male portion and its collar are being inserted into the counterbore, the indicator device comprising a ring-shaped portion surrounding the hydraulic circuit closed by the coupler, the ring being provided with at least two tabs extending in a direction parallel to the axis of the female portion, with, at their ends, respective snap-fastening teeth projecting into the housing of the latch.

BRIEF DESCRIPTION OF THE DRAWINGS

Other characteristics and advantages of the invention appear from the following description of some embodiments.

Reference is made to the accompanying drawing, in which:

FIGS. 1 and 2 are two fragmentary views of an embodiment of a coupler of the invention, FIG. 1 being an axial section and FIG. 2 being a view seen along F in FIG. 1; and FIG. 3 is a fragmentary view in axial section of the coupler in FIGS. 1 and 2 with a variant embodiment of the indicator device.

DETAILED DESCRIPTION OF THE INVENTION

A coupler of the invention includes a female portion 1 divided into a plurality of sections. A first section 2 constitutes a spigot having an inner channel 3 and outer christmas-tree shaped barbs 4 for inserting in a hose (not shown). The second section 5 of said portion 1 has a counterbore 6 of determined diameter for receiving the tip of an endpiece 7 forming the male portion of the coupler.

The third section 8 of said female portion has a counterbore 9 of diameter greater than the counterbore 6, for receiving two O-rings 10 and an insert 11 for blocking said O-rings. The inside diameter of the insert is equal to the diameter of the counterbore 6. The inside diameter of the insert is equal to the diameter of the counterbore 6. Finally, the female portion 1 has a fourth section 12 having an inside diameter 13 that is even greater than the diameter of the above-mentioned counterbores, so as to enable a collar 14 carried by the endpiece 7 to pass freely therethrough. As its outwardly-open end, the last section 12 of the female portion 1 has a latch 15 for preventing the endpiece 7 from being removed when it is correctly inserted in the female portion 1. The latch 15 is constituted by a ring which can slide in an open housing 15a made transversely in the female portion 1 and which includes one or two resilient tongues 16 on its outside which tend to offset the ring 15 relative to the counterbore 13. A portion of the inside edge of the ring 15 is beveled 17 so that when the collar 14 passes therethrough, the ring 15 is shifted against the effect of the resilient tongues 16 until the collar 14 is received inside the counterbore 13 beyond said ring 15. The tongues 16 then relax and return the ring to its free position, offset relative to the counterbore 13 so that one of its flanks comes into contact with the rear flank of the collar 14 and constitutes an abutment preventing the endpiece 7 from being removed.

In the figures, the indicator device 20 is in the form of a washer 40 that covers the front inlet face 1a of the female portion 1 of the coupler. As shown, the washer is split, terminating in two edges 40a which define a slot enabling the washer to deform. The edges 40a could be touching. The washer has a central rim 41 which engages in the opening of the female portion. The inside diameter of the rim 41 is greater than the diameter of the collar 14 of the male portion of the coupler. Two tabs 42 and 43 extend in a direction parallel to the axis of the female portion, one into the inlet opening and the other into a recess 44 provided in the front wall, so that the ends of said tabs form respective teeth 42a, 43a which are situated inside the housing 15a of the latch 15 so as to catch on the wall 1b of the portion 1 which separates the housing 15a from the face 1a. While the collar 14 is being passed through, the latch 15 is shifted (downwards in FIG. 1) and dislodges the teeth from the housing 15a. The washer 40 is then expelled (towards the right in the figure) and remains on the pipe to which the endpiece 7 is fastened. If the washer is split, the operator can then, if so desired, deform the washer and remove it completely from the pipe by passing the pipe through the slot defined between the edges 40a. As shown in FIG. 3, it is thus possible to fit the washer 40 with two or three retaining arms 45 which restrict the distance through which it can be expelled by coming into abutment against an outer cone-shaped shoulder 8a of the portion 1.

In addition, it should be observed that the washer 40 also has an upper cylindrical extension 46 which covers the portion of the latch 15 which projects from the female body 1 and which constitutes the unlocking pusher. It should be understood that when the collar 14 has reached the end of the counterbore 13, the latch 15 is in its locking position (that shown in FIG. 1) enabling the washer 40 to be put back in place on the end face of the portion 1. In this position, the extension 46 prevents access to the latch and eliminates any possibility of said latch being actuated accidentally.

Finally, in FIG. 3, it can be seen that the extension 46 has a rear tooth 47 (in its top central portion only) which retains the indicator device behind the latch 15 (its portion that is accessible from outside the pusher-forming body which is flush with the top edge of the inlet wall 1b of the portion 1. While the collar 14 is passing through, the latch 15 is shifted (downwards), releasing the washer 40 which is expelled by the resilient reaction of the tabs 42, 43 (towards the right). This displacement is however stopped by the tooth 47 which catches behind the wall 1b while the latch is in its low position. If for any reason the latch does not rise, which indicates a bad connection, the indicator device remains held by the tooth 47 behind the wall 1b, thereby warning the operator of the need to intervene. In contrast, a good connection allows the latch 15 to rise. The latch thus pushes the tooth 47 and the washer 40 can be separated from the female portion 1 until retained by the retaining arms 45, if any.

What is claimed is:

1. A quick coupler for a fluid circuit, the coupler comprising a male portion with an outer collar, and a female portion, the female portion having a stepped counterbore with a maximum diameter section that can receive the outer collar of the male portion, said section being beyond a latch that is movable in a housing extending transversely to the counterbore, and including a connection indicator device that is snap-fastened onto the female portion by means housed in part in the housing and released while the male portion and its collar are being inserted into the counterbore, the indicator device comprising a ring-shaped portion surrounding the fluid circuit closed by the coupler, wherein the ring-shaped portion is provided with at least two tabs extending in a direction parallel to an axis of the female portion, with, at their ends, respective snap-fastening teeth projecting into the housing of the latch in a location thereof which is swept by said latch moved by said outer collar wherein said location is such that when said latch sweeps said housing, said latch engages and dislodges said snap-fastening teeth from said female portion.

2. A coupler according to claim 1, wherein the indicator device is in the form of a split or slotted washer.

3. A coupler according to claim 1, wherein the ring-shaped portion includes a partial cylindrical extension, which, when the ring-shaped portion is snap-fastened, covers an outer zone of the female portion, thereby impeding access to the latch.

4. A coupler according to claim 3, wherein the latch includes a pusher that projects radially out from the female portion, in the vicinity of an inlet of the counterbore and that is flush with an outer rim of said inlet, and the ring-shaped portion includes at least one snap-fastening tooth that catches behind the pusher and behind the inlet rim of the counterbore during displacement of the pusher while the male portion of the coupler is being inserted into the female portion.

5. A coupler according to claim 1, wherein the ring-shaped portion is provided with at least two arms for limiting its stroke while it is being expelled.

6. A quick coupler for a fluid circuit, the coupler comprising:
   a male portion with an outer collar;
   a female portion having a stepped counterbore with a maximum diameter section for receiving said outer collar of said male portion and a latch that is movable in a housing that is transverse to said counterbore, said latch being upstream of said maximum diameter section with respect to a direction of insertion of said male portion; and
   a connection indicator device that is snap-fastened onto said female portion and releasable from said female portion when said male portion and said collar are inserted into said counterbore, said indicator device comprising a ring-shaped washer surrounding an inlet of said female device,
   wherein said washer includes at least one tongue, an end of said tongue having a snap-fastening tooth that projects into said housing and is disengagable from said female portion when engaged by said latch when said collar displaces said latch upon insertion of said collar into said female portion.

7. A quick coupler for a fluid circuit, the coupler comprising:
   a male portion with an outer collar;
   a female portion, the female portion having a stepped counterbore with a maximum diameter section that can receive the outer collar of the male portion, said section is beyond a latch that is movable in a housing extending transversely to the counterbore; and
   a connection indicator device that is snap-fastened onto the female portion by means housed in part in the housing and released while the male portion and its collar are being inserted into the counterbore, the indicator device comprising a ring-shaped portion surrounding the fluid circuit closed by the coupler, wherein the ring-shaped portion is provided with at least two tabs extending in a direction parallel to an axis of the female portion, with, at their ends, respective snap-fastening teeth projecting into the housing of the latch, and wherein the latch includes a pusher that projects radially out from the female portion, in the vicinity of an inlet of the counterbore and that is flush with an outer rim of said inlet, and the ring-shaped portion includes at least one snap-fastening tooth that catches behind the pusher and behind the inlet rim of the counterbore during displacement of the pusher while the male portion of the coupler is being inserted into the female portion.

* * * * *